US010776829B2

(12) United States Patent
Kang et al.

(10) Patent No.: US 10,776,829 B2
(45) Date of Patent: *Sep. 15, 2020

(54) SYSTEMS AND METHODS FOR DYNAMIC AD SELECTION OF MULTIPLE ADS OR AD CAMPAIGNS ON DEVICES

(71) Applicant: Vungle, Inc., San Francisco, CA (US)

(72) Inventors: Daniel Kang, San Francisco, CA (US); Raymond Myers, Foster City, CA (US); Sasha Solomon, San Francisco, CA (US); Christine Donovan, Oakland, CA (US); Ben Reiter, San Francisco, CA (US)

(73) Assignee: Vungle, Inc., San Francisco, CA (US)

( * ) Notice: Subject to any disclaimer, the term of this patent is extended or adjusted under 35 U.S.C. 154(b) by 380 days.

This patent is subject to a terminal disclaimer.

(21) Appl. No.: 15/792,987

(22) Filed: Oct. 25, 2017

(65) Prior Publication Data
US 2018/0047058 A1 Feb. 15, 2018

Related U.S. Application Data

(63) Continuation of application No. 14/677,962, filed on Apr. 2, 2015, now Pat. No. 9,818,134.

(51) Int. Cl.
*G06Q 30/00* (2012.01)
*G06F 16/2457* (2019.01)
(Continued)

(52) U.S. Cl.
CPC ....... *G06Q 30/0267* (2013.01); *G06F 3/0485* (2013.01); *G06F 3/04842* (2013.01);
(Continued)

(58) Field of Classification Search
CPC .......... G06Q 30/0267; G06F 16/24578; G06F 3/0482
(Continued)

(56) References Cited

U.S. PATENT DOCUMENTS

2002/0026638 A1* 2/2002 Eldering ............... G06Q 30/02
725/42
2001/0178445 11/2002 Eldering et al.
(Continued)

FOREIGN PATENT DOCUMENTS

EP 3278294 2/2018
KR 101172571 8/2012
(Continued)

OTHER PUBLICATIONS

Notification of Transmittal of the International Search Report and Written Opinion of the International Searching Authority for PCT/US2016/025342 dated Jul. 15, 2016, 12 pages.
(Continued)

*Primary Examiner* — Sun M Li
(74) *Attorney, Agent, or Firm* — Jaffery Watson Mendonsa & Hamilton LLP

(57) ABSTRACT

Methods and systems are described for dynamic ad selection of ads stored on a device. In one embodiment, a device includes a storage medium to store software programs including advertising services software and software applications. Processing logic is coupled to the storage medium and a display device. The processing logic is configured to execute instructions of at least one of the software programs to receive user input for initiating a software application on the device, determine attributes for the device including software applications currently operating in the storage medium and placement information for the initiated software application, and dynamically select one of the video ads stored on the device based on the attributes including software applications currently operating in the storage medium and placement information for the initiated software application.

20 Claims, 10 Drawing Sheets

(51) Int. Cl.
*G06F 3/041* (2006.01)
*G06Q 30/02* (2012.01)
*G06F 3/0484* (2013.01)
*G06F 3/0485* (2013.01)
*H04L 29/08* (2006.01)

(52) U.S. Cl.
CPC .... G06F 3/04847 (2013.01); G06F 16/24578 (2019.01); *G06F 2203/011* (2013.01); *H04L 67/1097* (2013.01); *H04L 67/2842* (2013.01)

(58) Field of Classification Search
USPC ......... 705/14.1, 14.53, 14, 66, 14.64, 14.55, 705/14.49
See application file for complete search history.

(56) References Cited

U.S. PATENT DOCUMENTS

| | | |
|---|---|---|
| 2006/0294084 A1 | 12/2006 | Patel et al. |
| 2008/0313029 A1* | 12/2008 | Evans .................... G06Q 30/02 705/14.53 |
| 2011/0113089 A1 | 5/2011 | Priyadarshan et al. |
| 2011/0234627 A1 | 9/2011 | Faulkner et al. |
| 2011/0314013 A1 | 12/2011 | Wang |
| 2012/0309511 A1* | 12/2012 | Chung ................. H04N 21/274 463/30 |
| 2013/0159103 A1 | 6/2013 | Foroughi et al. |
| 2013/0198772 A1 | 8/2013 | Wang et al. |
| 2014/0074601 A1 | 3/2014 | Delug |
| 2014/0188636 A1 | 7/2014 | Vandyke et al. |
| 2014/0278853 A1* | 9/2014 | Brown ............... G06Q 30/0209 705/14.12 |
| 2015/0006271 A1 | 1/2015 | Oppenheim |

FOREIGN PATENT DOCUMENTS

| | | |
|---|---|---|
| KR | 101172571 B1 | 8/2012 |
| KR | 101315468 | 10/2013 |
| WO | 2016161158 | 10/2016 |

OTHER PUBLICATIONS

Mohan et al., "Prefetching Mobile Ads: Can Advertising Systems Afford it?", Computer Systems, ACM, XP058015573, pp. 267-280.
Extended European Search Report for EP Application No. 16774231.1, 10 pages, dated Sep. 27, 2018.
Notification Concerning Transmittal of IPRP and Written Opinion for International Application No. PCT/US2016/025342, dated Jul. 16, 2017, 9 pages.
Office Action from U.S. Appl. No. 14/677,962, dated Mar. 23, 2016, 21 pages.
Office Action from U.S. Appl. No. 14/677,962, dated Jul. 22, 2015, 13 pages.
Notice of Allowance from U.S. Appl. No. 14/677,962, dated Jul. 20, 2017, 8 pages.
International Preliminary Report on Patentability for PCT/US2016/025342, 15 pages, dated Jul. 15, 2016.

* cited by examiner

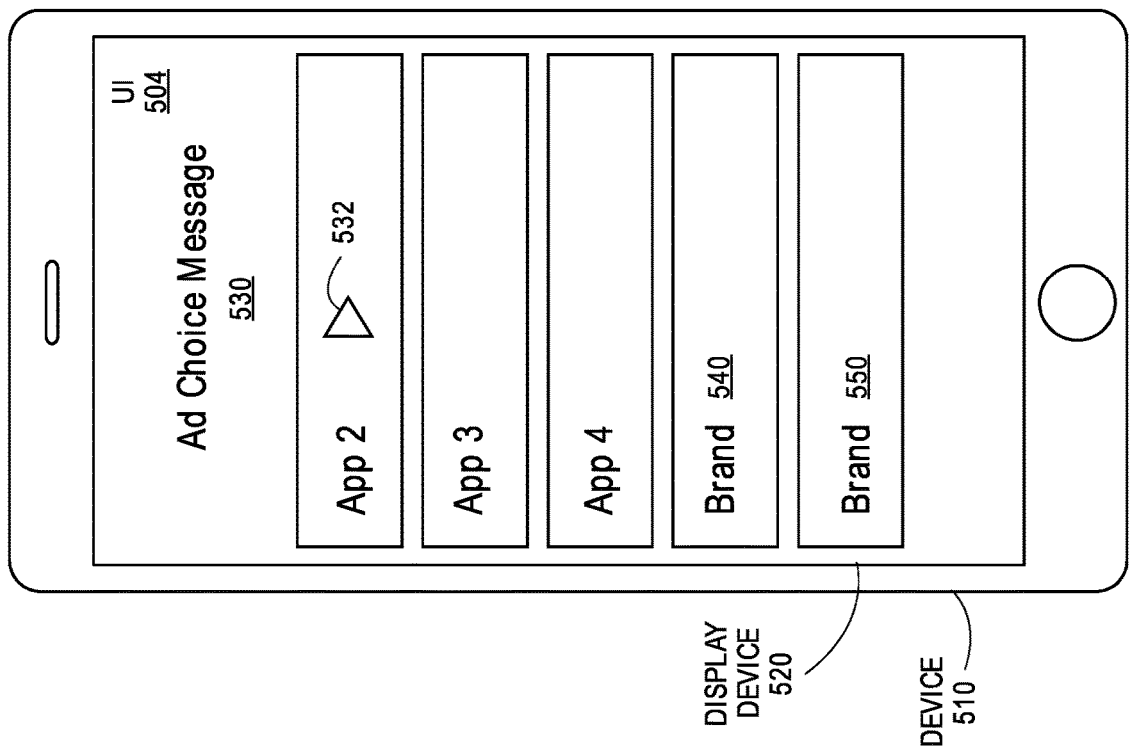
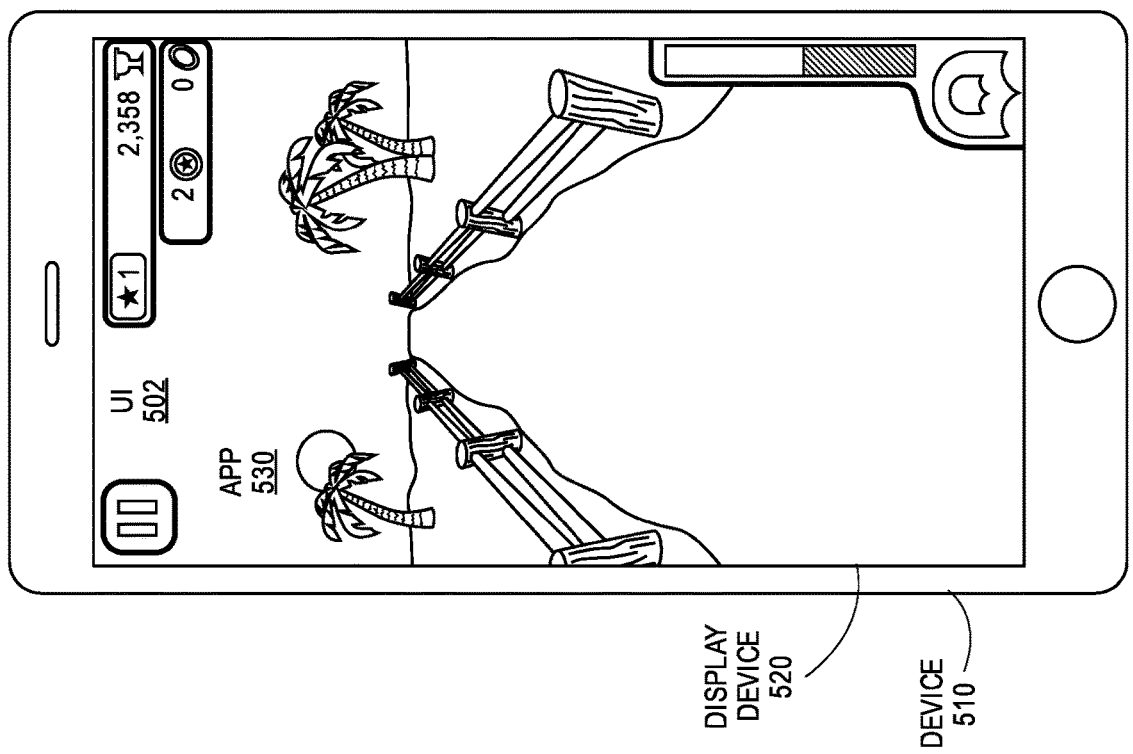
FIG. 5B
FIG. 5A

US 10,776,829 B2

SYSTEMS AND METHODS FOR DYNAMIC AD SELECTION OF MULTIPLE ADS OR AD CAMPAIGNS ON DEVICES

CROSS REFERENCE TO RELATED APPLICATIONS

The present patent application is a continuation application of U.S. application Ser. No. 14/677,962, filed Apr. 2, 2015, entitled, Systems and Methods for Dynamic Ad Selection of Multiple Ads or Ad Campaigns on Devices.

FIELD OF THE INVENTION

Embodiments of the invention are generally related to systems, devices, and methods for dynamic ad selection.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods, devices, and systems are described for providing advertising services with dynamic ad selection for display on devices. In one embodiment, a device includes a storage medium to store software programs including advertising services software and software applications, a cache memory, which is integrated or separate from the storage medium, to store video ads. A display device of the device displays software applications and video ads within the software applications. Processing logic is coupled to the storage medium, cache memory, and the display device. The processing logic is configured to execute instructions of at least one of the software programs to receive user input for initiating a software application on the device, determine attributes for the device including software applications currently operating in the storage medium and placement information for the initiated software application, and dynamically select one of the video ads based on the attributes including software applications currently operating in the storage medium and placement information for the initiated software application.

In another embodiment, a device includes a storage medium to store software programs including advertising services software and software applications, a cache memory, which is integrated or separate from the storage medium, to store video ads. A display device of the device displays software applications and video ads within the software applications. Processing logic is coupled to the storage medium, cache memory, and the display device. The processing logic is configured to execute instructions of at least one of the software programs to receive user input for initiating a software application on the device, determine attributes for the device including software applications currently operating in the storage medium and placement information for the initiated software application, dynamically rank the video ads based on the attributes including software applications currently operating in the storage medium and placement information for the initiated software application, and display the video ads on the display device in accordance with the ranking within the initiated software application during an ad play event of the initiated software application. A user can then select one of the video ads for display on the display device.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 5a-5d illustrate a sequence of exemplary user interface for displaying cached video ads in-app within a software application in accordance with one embodiment.

DETAILED DESCRIPTION

Figure 1:
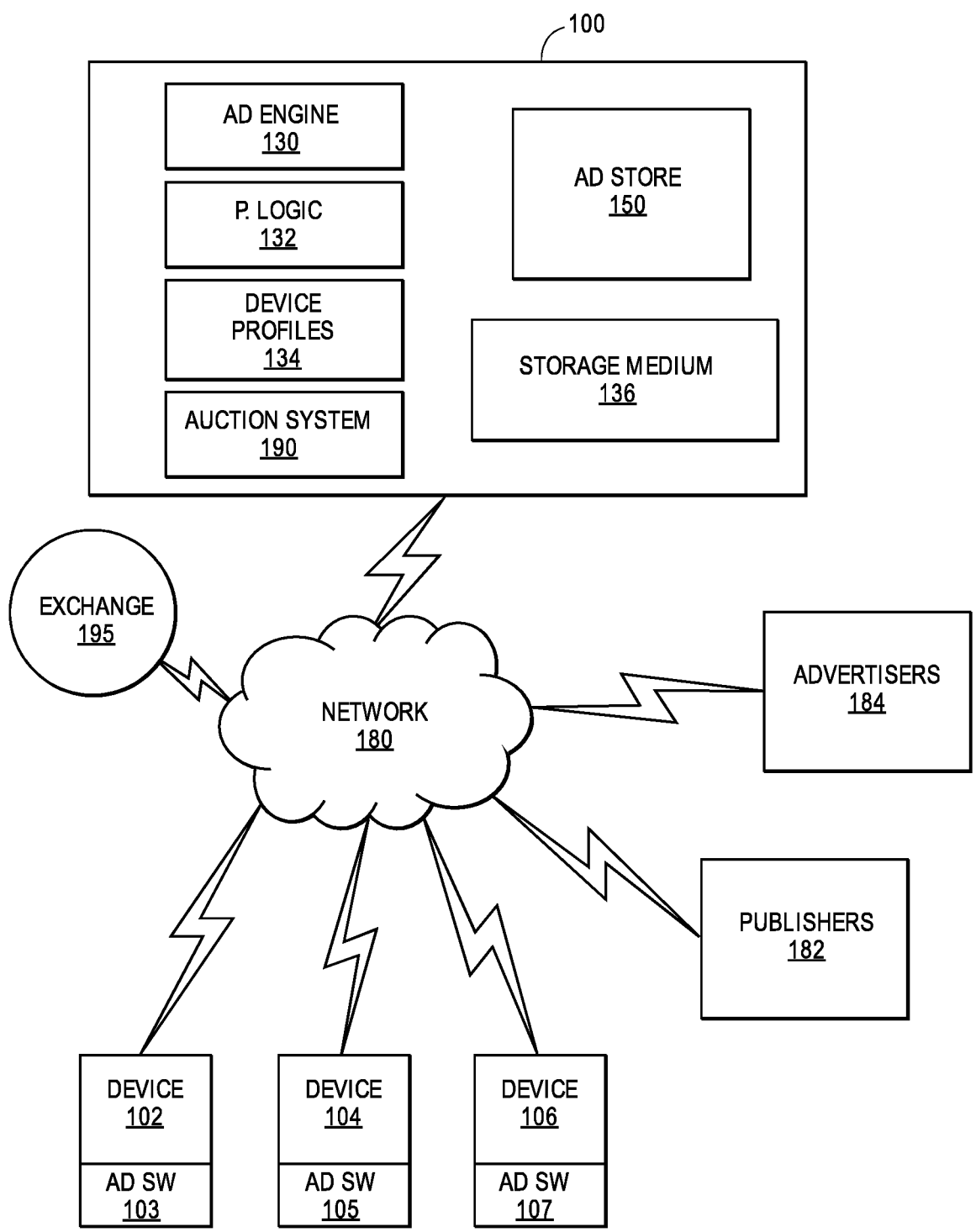
FIG. 1 shows an embodiment of a block diagram of a system 100 for providing advertising services with dynamic ad selection for delivering ads to devices via a network in accordance with one embodiment.

Methods, devices, and systems are described for providing advertising services with dynamic ad selection for display on devices. In one embodiment, a device includes a storage medium to store software programs including advertising services software and software applications, a cache memory, which is integrated or separate from the storage medium, to store video ads. A display device of the device displays software applications and video ads within the software applications. Processing logic is coupled to the storage medium, cache memory, and the display device. The processing logic is configured to execute instructions of at least one of the software programs to receive user input for initiating a software application on the device, determine attributes for the device including software applications currently operating in the storage medium and placement information for the initiated software application, and dynamically select one of the video ads based on the attributes including software applications currently operating in the storage medium and placement information for the initiated software application. The processing logic of the device includes improved computer functionality for dynamically selecting a video ad in real time that is predicted to be at least one of more engaging for a user, cause more interaction with the user, and more likely to convert the video ad into an action, transaction, installation, or purchase based on the attributes or characteristics of the device or user.

An auction system provides a mechanism for third party participants to bid on providing advertising services including in-application (in-app) advertising services to the device in response to a predictive ad exchange request. The auction system captures demand for providing advertising services in real time or near real time prior to a predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of mobile applications and games. The publishers are interested in generating revenue through displaying video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertisers bid on ad placement on a cost-per-click (CPC), cost-per-mille (CPM), cost-per-completed-view (CPCV), cost-per-action (CPA), and/or cost-per-install (CPI) basis. A mille represents a thousand impressions on user's devices. In one example, CPA is defined by an advertiser. CPA is an advertising pricing model in which the advertiser pays for each specified action (e.g., impression, click, form submit, opt-in, sale, etc.). The advertiser determines the desired action. For in-app purchases, actions may include software application installs, purchases, finishing a tutorial, and completing a certain percentage of a software application.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of an ad system 100 for providing advertising services including dynamic ad selection to a device via a network in accordance with one embodiment. The ad system 100 includes an advertising engine 130, processing logic 132, device profiles 134, storage medium 136, and an auction system 190. The auction system 190 may be integrated with the ad system or separate from the ad system. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, etc.) via a network 180. A device profile for a device is based on one or more parameters including location (e.g., GPS coordinates, IP address, cellular triangulation, etc.) of the device, a social profile for a user of the device, and categories or types of applications installed on the device. Each device includes a respective advertising services software 103, 105, 107 (e.g., a software development kit (SDK)) that includes a set of software development tools for advertising services including in-app advertising services (e.g., advertising services delivered within mobile applications, advertising services delivered within non-web browser applications). The publishers 182 publish content along with ads. The system 100, devices 102, 104, 106, advertisers 184, publishers, and an ad exchange 195 with third party exchange participants communicate via a network 180 (e.g., Internet, wide area network, WiMax, satellite, cellular, IP network, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. In-app ad campaigns are ad campaigns (e.g., video ads) served to devices in-app (e.g., within mobile applications on a mobile device, within non-web browser software applications on a device, etc). The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134, device id, device age, OS type, network connection for user's device, whether user's device is mobile device or tablet device, volume, screen size and orientation, language setting, etc.), and user characteristics (e.g., age, gender, ethnicity, location, etc.). etc.

In one embodiment, the system 100 includes a storage medium 136 to store one or more software programs. Processing logic (e.g., 132) is configured to execute instructions of at least one software program to receive an advertising request from a device upon the device having an ad play event in-app within an initiated software application (e.g., any type of software application, non-web browser software applications) and associated advertising services software (e.g., software development kit (SDK)) on the device. The processing logic is further configured to send a configuration file to the device in response to the configuration call. The configuration file includes different options for obtaining at least one advertisement (ad) to play on the device in-app during an ad play event. The options include playing at least one ad cached on the device, obtaining at least one ad from an ad store of the ad system 100, and obtaining at least one ad from an advertising exchange that includes $3^{rd}$ party participants.

Figure 2:
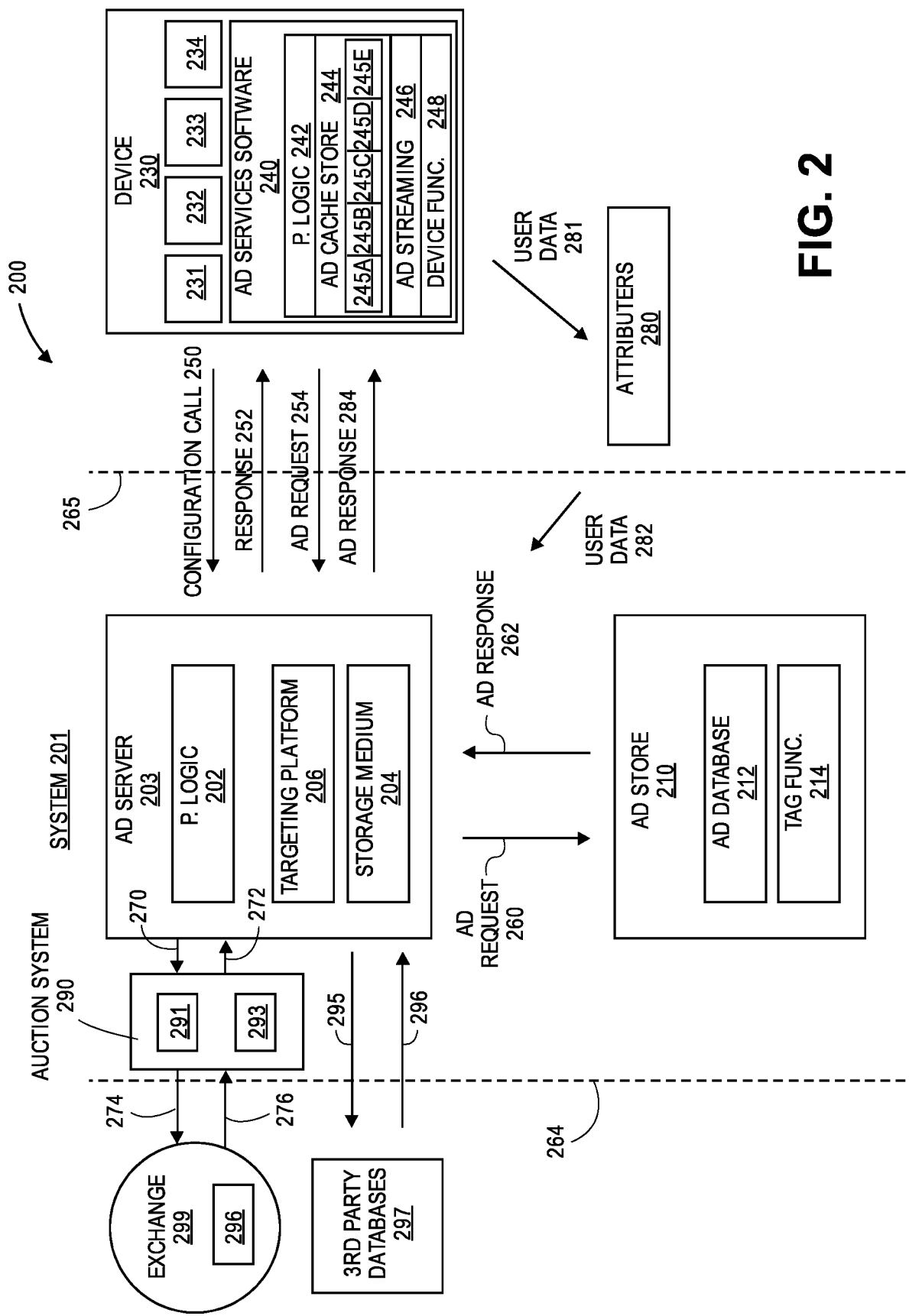
FIG. 2 illustrates a flow diagram of operations for providing advertising services with dynamic ad selection in accordance with certain embodiments.

FIG. 2 illustrates a flow diagram of operations for providing advertising services with dynamic ad selection in accordance with certain embodiments. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200. In one example, the vertical dashed lines 264 and 265 represent a separation of the components of the system 201 (e.g., ad server 203, auction system 290, ad store 210) and components external to the system 201 (e.g., device 230, attributers 280, exchange 299, third party databases 297). The components of the system 201 communicate with the components external to the system via a network (e.g., network 180).

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications. The advertising services software 240 is also initiated upon the initiation of one of the software applications. The advertising services software 240 may be associated with or embedded with the software applications. The advertising services software 240 may include or be associated with processing logic 242 (e.g., communication logic for communications such as an ad request), an ad cache store 244 for storing one or more ads or ad campaigns (e.g., video ads 245a, 245b, 245c, 245d, 245e, etc.), ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 via a network upon the initiation of the software application and associated advertising services software 240. At operation 252, the processing logic 202 sends a response that includes the configuration file to the device 230 via the network in response to the configuration call. The configuration file includes different options for obtaining an ad to play for the ad play event. In one embodiment, a first option includes playing at least one ad (e.g., video ads 245a, 245b, 245c, 245d, 245e, etc.) that is cached on the device 230 during the ad play event or prior to the ad play event. A second option includes planning to play at least one ad that is cached on the device 230 but asking for at least one better ad from the system 201. If the system 201 provides at least one better ad (i.e., more likely to convert) in a timely manner (e.g., in time for a predicted ad play event, within a time period set by the configuration file) then the better ad will play during the predicted ad play event. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 via a network but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices via the network using the configuration file.

At operation 254, prior to a predicted ad play event, the processing logic of the ad server optionally receives a predictive ad request with a configurable option (e.g., options 1-8) of the configuration file based on an anticipated ad play event occurring in the near future (e.g., 1 hr, 15 minutes, 60 seconds, 10 seconds, etc.). Alternatively, the ad server generates a predictive ad request based on receiving the configuration call, which indicates that the user has initiated a software application and an anticipated ad play event will likely occur in the near future even though no predictive ad request is received from the device. The predictive ad request may also include different types of information including a publisher of the selected software application, placement information for placement of an ad in-app, user characteristics, and device characteristics. The ad server processes the predictive ad request and accesses at least one of the ad store 210 and the exchange 299 for options 2-8 of the configuration file. The ad server may determine which option of options 1-8 will be processed or enabled for processing the ad request based on one or more configurable parameters. Alternatively, the device or user may determine which option of options 1-8 will be processed or enabled based on these parameters.

In one embodiment, the configurable parameters include the bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). For example, if a low bandwidth is detected between the ad server and the device or between the ad system and auction participants, then the ad server may sent an ad request to the ad store or the auction system sooner rather than later. In one embodiment, the ad request is sent to the ad store or the auction system immediately or a short time after the low bandwidth is detected. A third party participant within the exchange or outside of the exchange may provide the ad system with timing parameters. For example, a third party participant may indicate to only request an ad if an ad is about to be served to a device (e.g., within 2 seconds, within 15 seconds) or if an ad will likely be served to a device in the next hour or so.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. The user data (e.g., user data 282) can be shared with the system 201, publishers, and advertisers via a network.

For option 1, the device plays at least one ad from cache. For options that access the ad store 210, at operation 260, the processing logic 202 sends a predictive ad call or request to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the predictive ad call or request. The ad response includes a payload with one or more potential ads or ads campaigns for being streamed to the device 230 or optionally an ad serving tag for accessing one or more third party ad databases 297. If the ad server receives an ad serving tag, then the ad server sends an ad request to the third party database at operation 295 and receives an ad response at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the configurable file.

The ad server upon processing a predictive ad request may access the exchange 299 given certain options (e.g., options 3, 4, 7, and 8) of the configuration file. In this case, the ad server sends a predictive exchange request 270 to the auction system 290 having an auction engine 291 and database 293 prior to a predicted ad play event on the device. Alternatively, the auction system is integrated with the ad system 201. The auction engine 291 processes the predictive exchange request 270 and generates an auction based on different business rules including at least one of a price (e.g., a floor or lowest price for the ad or ad campaign), inventory allocation, and participants who can participate in the auction. The auction determines which participant can provide a better ad for the device in a timely manner. At operation 274, the auction system 290 sends a predictive ad exchange request to each participant of the auction. The predictive ad exchange request includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with a predictive ad exchange response at operation 276. The auction engine processes the predictive ad exchange responses (bids) and determines which participant(s) if any will serve a better ad for playing on the device for a predicted ad play event. The responses and ads from the participants can be saved in the database 293. At operation 272, a predictive ad response is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 284, the ad server can then select at least one better ad from the ad store, a participant with a winning or selected bid from the exchange, a cached ad on the device, or optionally a third party database 297 that has not participated in the exchange. A better ad is anticipated to be more likely to convert than a cached ad on the device. The at least one better ad if selected is then cached on the device or streamed to the device and played during the ad play event that has been predicted to occur.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during an ad play event. However, better, fresher, more relevant ads (i.e., higher converting ads) may be available in comparison to the cached ad of the conventional ad network.

A targeting platform 206 includes different parameters for targeting users in ad campaigns and may include one or more performance based algorithms that utilized these different parameters for creating a performance based ad campaign. Alternatively, the performance based algorithms may be included in the ad engine 130 and obtain data from the targeting platform for creating a performance based ad campaign. The parameters include device characteristics (e.g., device id for uniquely identifying a device, device age, OS type, network connection for user's device, whether user's device is mobile device or tablet device, volume, screen size and orientation, language setting, etc.) and user characteristics (e.g., user spend, conversion rate, engagement rate, app type, in-app purchase (IAP) activity, etc.) from any source including the system 100, attributers 186, advertisers 184, and publishers 182. The conversion rate may be used to divide users into different groups based on the predicted conversion rate for each user. A category conversion rate can indicate how likely a conversion occurs for a user with a particular app category (e.g., sports games, war games, quest games, newspaper apps, restaurant apps, entertainment apps, fashion apps, brand apps, etc.). An engagement rate is used to target users having a high ad or strong engagement during ad play events. The engagement rate indicates how engaged a user is with an ad in terms of cognitive (e.g., awareness, interest), physical (e.g., user-initiated transaction), and emotional factors. In one example, engagement with an ad video is measured in terms of play rate, playthrough rate, completion rates, video viewing time, and share rates. In another example, rich media engagement is measured in terms of display times, expansions, expansion times, interaction time and rate, form responses, game play, and share rates. In another example for mobile devices, engagement includes click to call, retail location, interaction rates, click to download, click to play, and share rates. An app type may target users having competitor apps installed or users that have a particular "X" app installed. The competitor apps are competitors of publishers or developers that want to advertise to users of the competitor apps. The TAP activity targets users with TAP activity as indicated by user data from the system's 100 data pipeline.

In one example, closing a video ad at an earliest opportunity can be interpreted as a negative emotion in regards to the video ad. A user's interaction with hardware (e.g., display device, motion device, gyroscope, accelerometer, smart watch, heart rate monitor, blood pressure sensor, etc.) may also be used to infer an emotional state of the user. For example, a user can interact with an interactive end card of an ad campaign by touching numerous touch points on a display device of a device to indicate an emotional state. A user can move the device in a certain shape or pattern that can be detected by a motion device.

In one embodiment, a system (e.g., system 201) includes an ad store (e.g., ad store 210 to store advertisements (ads) and an ad server (e.g., ad server 203) coupled to the ad store. The ad server includes a storage medium to store one or more software programs and processing logic that is configured to execute instructions of at least one software program to generate with the system, prior to a predicted ad play event on a device (e.g., device 230), a predictive ad request for obtaining at least one advertisement (ad) from at least one of the ad store and an advertising exchange (e.g., ad exchange 299) prior to the predicted ad play event. The processing logic is further configured to execute instructions to process the predictive ad request and determine whether the ad store of the system to be accessed for at least one ad to be cached on the device prior to an actual ad play event and whether the ad exchange to be accessed for at least one ad to be cached on the device prior to the actual ad play event. The processing logic is further configured to execute instructions to determine, just prior to the actual ad play event, a bandwidth for a connection between the device and the system.

The processing logic is further configured to execute instructions of at least one software program to determine if any ad source (e.g., ad store 210, exchange 299, third party databases 297) includes at least one ad that is more likely to convert than the ads cached on the device based on the bandwidth for the connection between the device 230 and the system 201 for streaming the at least one ad from any ad source to the device in time for the actual ad play event. The processing logic is further configured to execute instructions of at least one software program to select at least one ad that is most likely to convert from any ad source or the cached ads on the device prior to the actual ad play event.

In one embodiment, the processing logic 202 or processing logic 242 is configured to execute instructions of at least one software program to select at least one ad that is most likely to convert from the cached ads on the device prior to the actual ad play event. In one example, sufficient bandwidth is not available for streaming an ad or ad campaign from any ad source to the device in time for the ad play event. In another example, a publisher setting requires that an ad is selected from the ad cache store 244.

In one embodiment, the processing logic (e.g., 202, 242) is configured to execute instructions of at least one software program to receive user input for initiating a software application (e.g., 231, 232, 233, 234) on the device, to determine attributes for the device including software applications (e.g., 231, 232, 233, 234) currently operating in a storage medium of the device and placement information for the initiated software application (e.g., 231, 232, 233, 234), and to dynamically select one of the video ads (e.g., video ads 245*a*, 245*b*, 245*c*, 245*d*, 245*e*, etc.) based on the attributes including software applications currently operating in the storage medium and placement information for the initiated software application. The processing logic 242 is further configured to execute instructions of the at least one software program to display the selected video ad (e.g., an optimal video ad most likely to cause user engagement, user interaction, and user conversion) in-app within the initiated software application (e.g., mobile software application, non-web browser software application) on a display device of the device during an ad play event of the initiated software application.

Figure 3:
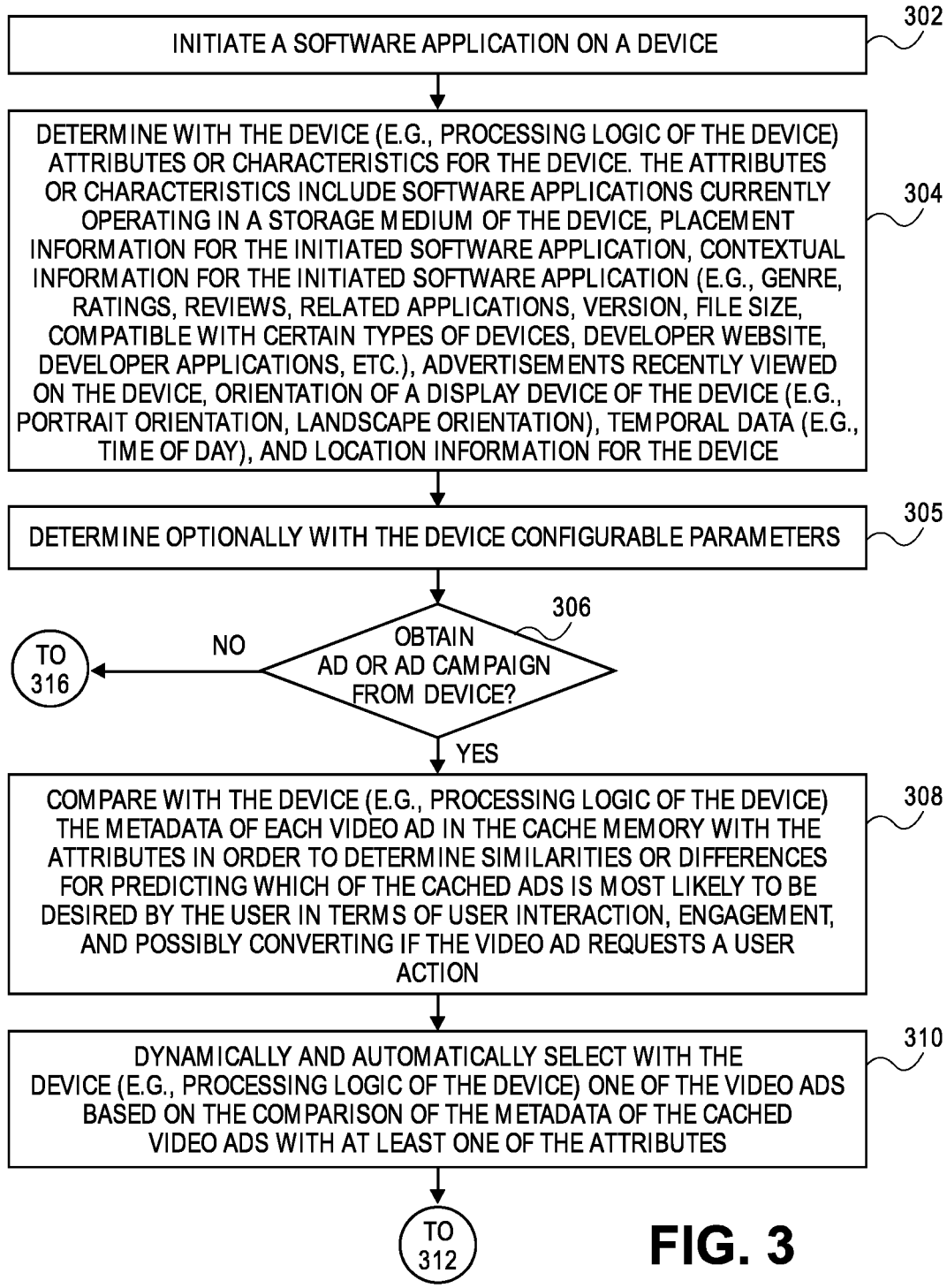
FIG. 3 illustrates a flow diagram of operations for a method of dynamic ad selection in accordance with one embodiment.
Figure 3:
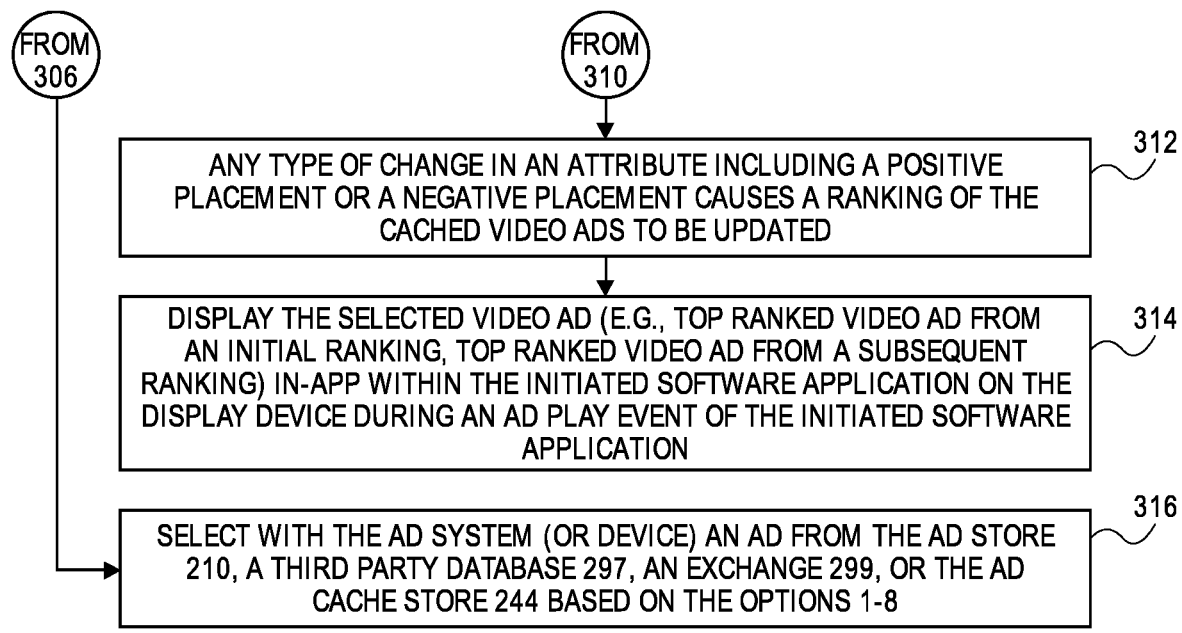

FIG. 3 illustrates a flow diagram of operations for a method of dynamic ad selection of video ads for a device in accordance with one embodiment. The advertising operational flow for dynamic ad selection may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device (or ad system) performs the operations of method 300.

In one embodiment, a device initiates a software application at operation 302. For example, a user may select one of the software applications. The advertising services software (e.g., SDK) is also initiated upon the initiation of the software application. The SDK may be associated with or embedded with the software application. The advertising services software may include or be associated with processing logic 242, an ad cache store 244, ad streaming functionality 246, and device functionality 248 of device 230. The initiated software application may have an ad play event for displaying or playing an ad (e.g., video ad) on the display of the device.

At operation 304, the device (e.g., processing logic of the device) determines attributes or characteristics for the device. The attributes or characteristics include software applications currently operating in a storage medium of the device, placement information for the initiated software application, contextual information for the initiated software application (e.g., genre, age ratings, reviews, downloads, related applications, version, file size, compatible with certain types of devices, developer website, developer applications, etc.), advertisements recently viewed on the device, orientation of a display device of the device (e.g., portrait orientation, landscape orientation), temporal data (e.g., time of day), and location information for the device. The contextual information can be obtained from an application service or market place service. At operation 305, the device optionally determines configurable parameters including the bandwidth for the connection between the device and an ad system, bandwidth for a connection between the ad system and one or more participants of an exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). At operation 306, the device determines whether to obtain an ad or ad campaign via the ad system or from the device based on the configurable parameters. The ad system communicates with the device via a network (e.g., network 180).

For example, if a low bandwidth is detected between the ad system and the device or between the ad system and auction participants, then the device may determine an ad selection from the ads stored on the device rather than sending a communication (e.g., configuration call, predictive ad request) to the ad system. In another example, a publisher setting (e.g., a service level agreement) may provide instructions to use the ad cache store for selection of an ad regardless of the bandwidth for the network connection with the ad system. In another example, sufficient bandwidth is available for communicating with the ad system. However, the device may automatically select an ad dynamically from the ad cache store if the cached ads are predicted to be engaging ads with a high predicted conversion rate. In this example, operations 305 and 306 do not occur for this method 300.

The software applications currently operating in active, suspended, or sleep mode in the storage medium include software applications in the foreground (i.e., visible to the user, at least one active process, active interaction with the user), background (i.e., not visible to the user, at least one potential active process) in a suspended or sleep mode, and closed applications in a sleep mode. The applications in the suspended or sleep modes may be periodically refreshed for certain updates or processes. Applications with no operations (e.g., apps forced to close with no operations, apps shut down with no operations upon resetting or powering down the device) are not included as an application operating in the storage medium.

The ad cache store 244, which may be integrated with the storage medium or separate from the storage medium, includes different cached video ads stored on the device prior to an ad play event of the initiated software application. Each cached video ad includes metadata (e.g., genre, age ratings, reviews, downloads, related applications, version, file size, compatible with certain types of devices, developer website, developer applications, etc. for a software application associated with the video ad). In one example, the genre and rating for a software application is obtained with a market place query to an app service or market place service. In another example, a cached video ad is not associated with an app and no market place query occurs. If the device determines an ad selection from the ads in the ad cache store without communicating with the ad system (no configuration call) either at operation 306 or automatically without operations 305 and 306, then at operation 308, the device (e.g., processing logic of the device) compares the metadata of each video ad in the cache memory with the attributes or characteristics in order to determine levels of similarities, levels of differences, similar or different applications, etc. for predicting which of the cached ads is most likely to be desired by the user in terms of user interaction, engagement, and possibly converting if the video ad requests a user action.

At operation 310, the device (e.g., processing logic of the device) dynamically and automatically selects one of the video ads based on the comparison of the metadata of the cached video ads with at least one of the attributes. In one example, the metadata is compared to at least some of the attributes including software applications currently operating in the storage medium and placement information for the initiated software application. For example, the device can generate scores or rankings for the cached video ads based on the comparison and dynamically select a video ad with a highest score or ranking. In one example, a user has initiated a first type of application while other types of applications are operating in the storage medium. A video ad that is cached and more relevant compared to other cached ads for at least one of the other types of applications may have a higher score or ranking. In another example, a cached video ad is removed from the storage medium or given a lower ranking if the cached video ad is associated with an application that is already installed on the user's device.

The placement information for the initiated software application includes a timing for when a video ad is displayed within the initiated software application. For example, for a gaming application a video ad can be displayed when the gaming application opens, closes, in between levels of the gaming applications, when a character of the user dies within the gaming application, when a user or character of the user wants to buy an item, or when the user unlocks an achievement or reward with the gaming application.

The device assigns a positive placement for a positive user experience (e.g., application opened, user unlocks achievement or reward, frequent use of an application, user increases a volume setting of the device) while using the initiated software application and assigns a negative placement for a negative user experience (e.g., user dies within the software application, infrequent use of an application, user decreases a volume setting of the device) while using the initiated software application. Certain ads (e.g., brand ads with no requested action) that do not request any user action may be appropriate for the positive placement while other ads (e.g., CPI, CPA, brand ads with requested action) that do request user action may be appropriate for the negative placement. A user having a negative experience may be more likely to switch to a different application, game, product, or service. Any type of change for any attribute including a positive placement or a negative placement will cause a ranking of the cached video ads to be updated at operation 312 and potentially a different video ad to be dynamically selected for display during an ad play event. For example, a first cached video ad appropriate for a positive placement may have been dynamically selected while a user is having a positive experience in-app with the initiated software application. If the user then has a negative experience, then a second cached video ad appropriate for a negative placement may be dynamically selected instead of the first cache video ad and displayed for an in-app ad play event.

At operation 314, the processing logic is further configured to execute instructions of the at least one of the software programs to display the selected video ad (e.g., top ranked video ad from an initial ranking, top ranked video ad from a subsequent ranking) in-app within the initiated software application on the display device during an ad play event of the initiated software application. The processing logic of the device includes improved computer functionality for dynamically selecting an in-app (e.g., within mobile applications, within non-web browser applications) video ad in real time that is predicted to be at least one of more engaging for a user, cause more interaction with the user, and more likely to convert the video ad into an action, transaction, installation, or purchase based on the attributes or characteristics of the device or user.

If the device determines an ad selection by communicating with the ad system (e.g., configuration call) at operation 308, then the ad system (or device) selects an ad from the ad store 210, a third party database 297, an exchange 299, or the ad cache store 244 based on the options 1-8 at operation 316. In other words, the operations of FIG. 2 occur for obtaining a relevant highly engaged ad or ad campaign.

Figure 4:
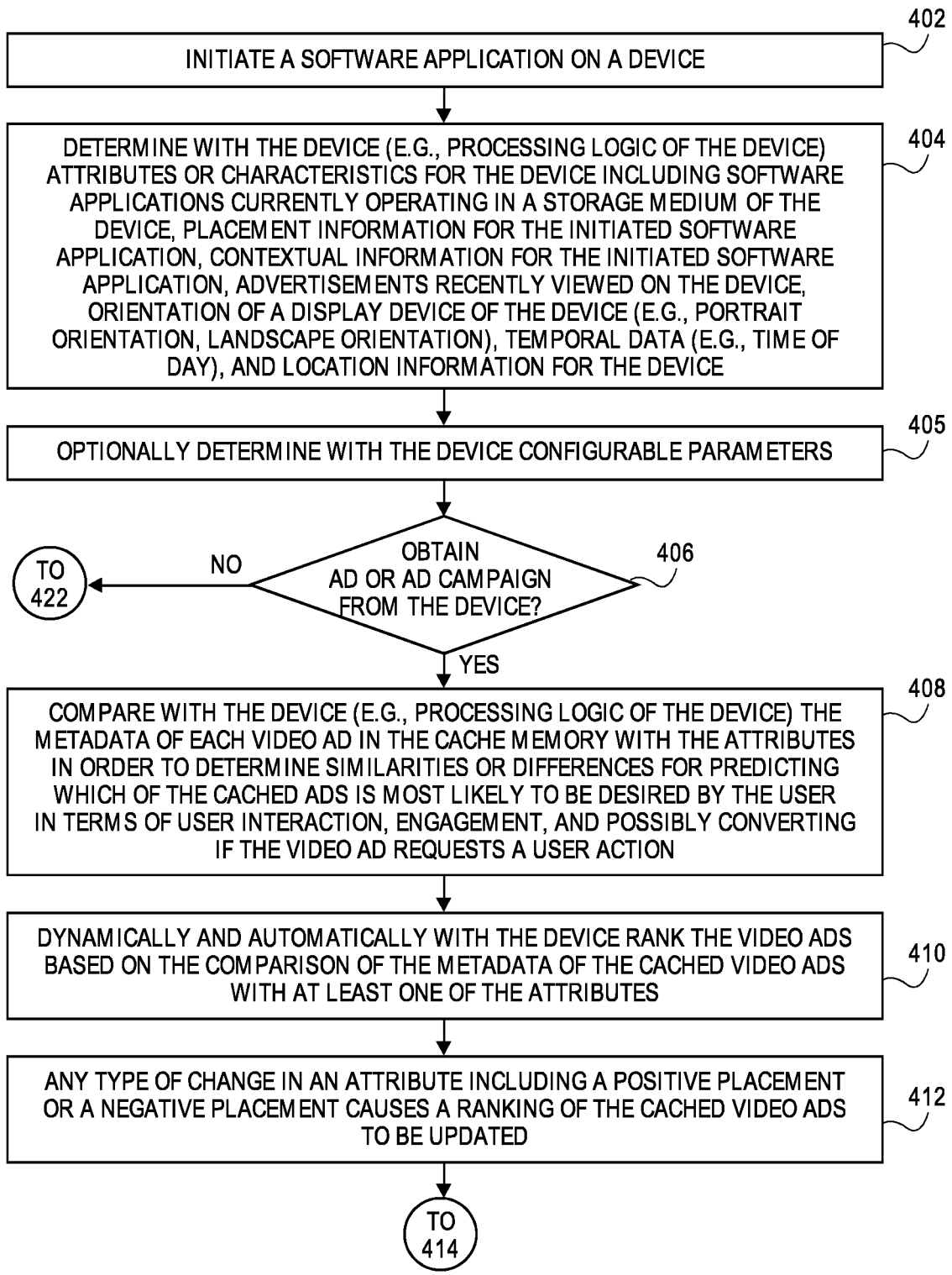
FIG. 4 illustrates a flow diagram of operations for a method of dynamic ad selection in accordance with one embodiment.
Figure 4:
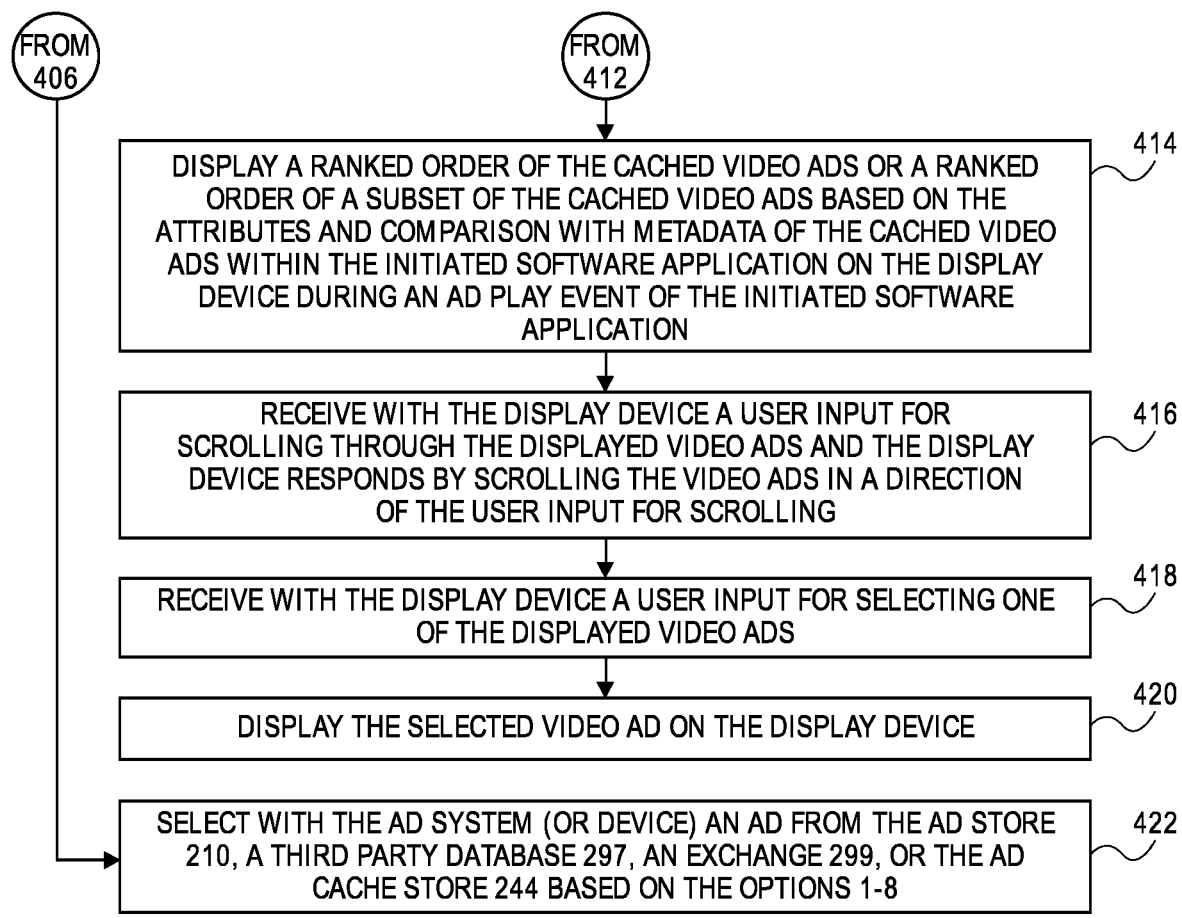

FIG. 4 illustrates a flow diagram of operations for a method of dynamic ad selection of video ads for a device in accordance with one embodiment. The advertising operational flow for dynamic ad selection may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device (or ad system) performs the operations of method 400. In one embodiment, a device initiates a software application at operation 402. For example, a user may select one of the software applications on the device. The advertising services software (e.g., SDK) is also initiated upon the initiation of the software application. The SDK may be associated with or embedded with the software application. The advertising services software may include or be associated with processing logic 242, an ad cache store 244, ad streaming functionality 246, and device functionality 248 of device 230. The initiated software application may have an ad play event for displaying or playing an ad on the display of the device.

At operation 404, the device (e.g., processing logic of the device) determines attributes or characteristics for the device. The attributes or characteristics include software applications currently operating in a storage medium of the device, placement information for the initiated software application, contextual information for the initiated software application, advertisements recently viewed on the device, orientation of a display device of the device (e.g., portrait orientation, landscape orientation), temporal data (e.g., time of day), and location information for the device. At operation 405, the device optionally determines configurable parameters including the bandwidth for the connection between the device and an ad system, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). At operation 406, the device determines whether to obtain an ad or ad campaign via the ad system or from the device based on the configurable parameters. The ad system communicates with the device via a network (e.g., network 180).

For example, if a low bandwidth is detected between the ad system and the device or between the ad system and auction participants, then the device may determine an ad selection from the ads stored on the device rather than sending a communication (e.g., configuration call, predictive ad request) to the ad system. In another example, a publisher setting (e.g., a service level agreement) may provide instructions to use the ad cache store for selection of an ad regardless of the bandwidth for the network connection with the ad system. In another example, sufficient bandwidth is available for communicating with the ad system. However, the device may automatically select an ad dynamically from the ad cache store if the cached ads are predicted to be engaging ads with a high predicted conversion rate. In this example, operations 405 and 406 do not occur for this method 400.

The software applications currently operating in active, suspended, or sleep mode in the storage medium include software applications in the foreground (i.e., visible to the user, at least one active process, active interaction with the user), background (i.e., not visible to the user, at least one potential active process) in a suspended or sleep mode, and closed applications in a sleep mode. The applications in the suspended or sleep mode may be periodically refreshed for certain updates or processes. Applications that have been shut down with no operations are not included as an application operating in the storage medium.

The ad cache store 244, which may be integrated with the storage medium or separate from the storage medium, includes cached video ads stored on the device prior to an ad play event of the initiated software application. Each cached video ad includes metadata (e.g., a genre and a rating for a software application associated with the video ad). If the device determines an ad selection from the ads in the ad cache store without communicating with the ad system (no configuration call) either at operation 406 or automatically without operations 405 and 406, then at operation 408, the device (e.g., processing logic of the device) compares the metadata of each video ad in the cache memory with the attributes in order to determine similarities or differences for predicting which of the cached ads is most likely to be desired by the user in terms of user interaction, engagement, and possibly converting if the video ad requests a user action.

At operation 410, the device (e.g., processing logic of the device) dynamically and automatically ranks the video ads based on the comparison of the metadata of the cached video ads with at least one of the attributes. In one example, the metadata is compared to attributes including software applications currently operating in the storage medium and placement information for the initiated software application. For example, the device can rank the cached video ads and display the video ads in order of the ranking.

The placement information for the initiated software application includes a timing for when a video ad is displayed within the initiated software application. For example, for a gaming application a video ad can be displayed when the gaming application opens, closes, in between levels of the gaming applications, when a character of the user dies within the gaming application, when a user or character of the user want to buy an item, or when the user unlocks an achievement or reward with the gaming application. The device assigns a positive placement for a positive user experience (e.g., application opened, user unlocks achievement or reward, frequent use of an application, user increases a volume setting of the device) while using the initiated software application and assigns a negative placement for a negative user experience (e.g., user dies within the software application, infrequent use of an application, user decreases a volume setting of the device) while using the initiated software application. Any type of change in an attribute including a positive placement or a negative placement will cause a ranking of the cached video ads to be updated at operation 412 and a different order of the video ads can be displayed to the user.

For example, a first cached video ad appropriate for a positive placement may have been dynamically selected while a user is having a positive experience with the initiated software application. If the user then has a negative experience, then a second cached video ad appropriate for a negative placement may be dynamically selected instead of the first cache video ad and displayed for an ad play event.

At operation 414, the processing logic is further configured to execute instructions of the at least one of the software programs to display a ranked order of the cached video ads or a ranked order of a subset of the cached video ads based on the attributes and comparison with metadata of the cached video ads in-app within the initiated software application on the display device during an ad play event of the initiated software application. In one example, all video ads are ranked and displayed in order on the display device with a highest ranked ad being near an upper edge of the display device if in portrait orientation or near a left edge of the display device if in landscape orientation. In another example, a first subset (e.g., 3) of the video ads have similar higher scores for a ranking while a second subset (e.g., 2) of the video ads have lower scores for the ranking. In this case, the device only displays the first subset of the video ads to the user.

At operation 416, the display device receives a user input for scrolling through the displayed video ads and the display device responds by scrolling the video ads in a direction of the user input for scrolling. At operation 418, the display device receives a user input for selecting one of the displayed video ads. At operation 420, the selected video ad is displayed on the display device. The processing logic of the device includes improved computer functionality for dynamically selecting a video ad in real time that is predicted to be at least one of more engaging for a user, cause more interaction with the user, and more likely to convert the video ad into an action, transaction, installation, or purchase based on the attributes or characteristics of the device or user. Alternatively, the user is provided all of the cached ads or a subset of the cached in order for the user to personally select a desirable, engaging, interactive video ad in accordance with preferences of the user.

If the device determines an ad selection by communicating with the ad system (e.g., configuration call) at operation 408, then the ad system (or device) selects an ad from the ad store 210, a third party database 297, an exchange 299, or the ad cache store 244 based on the options 1-8 at operation 422. In other words, the operations of FIG. 2 occur for obtaining a relevant highly engaged ad or ad campaign.

In some embodiments, the operations of the methods disclosed herein can be altered, modified, combined, or deleted. For example, the operations 305 and 306 can occur early or later in the flow of operations of method 300 or not at all. In a similar manner, the operations 405 and 406 can occur early or later in the flow of operations of method 400 or not at all. The methods in embodiments of the present invention may be performed with an apparatus or data processing system as described herein. The apparatus or data processing system may be a conventional, general-purpose computer system or special purpose computers, which are designed or programmed to perform a limited number of advertising targeting and serving functions in-app to client devices, may also be used.

Figure 5D:
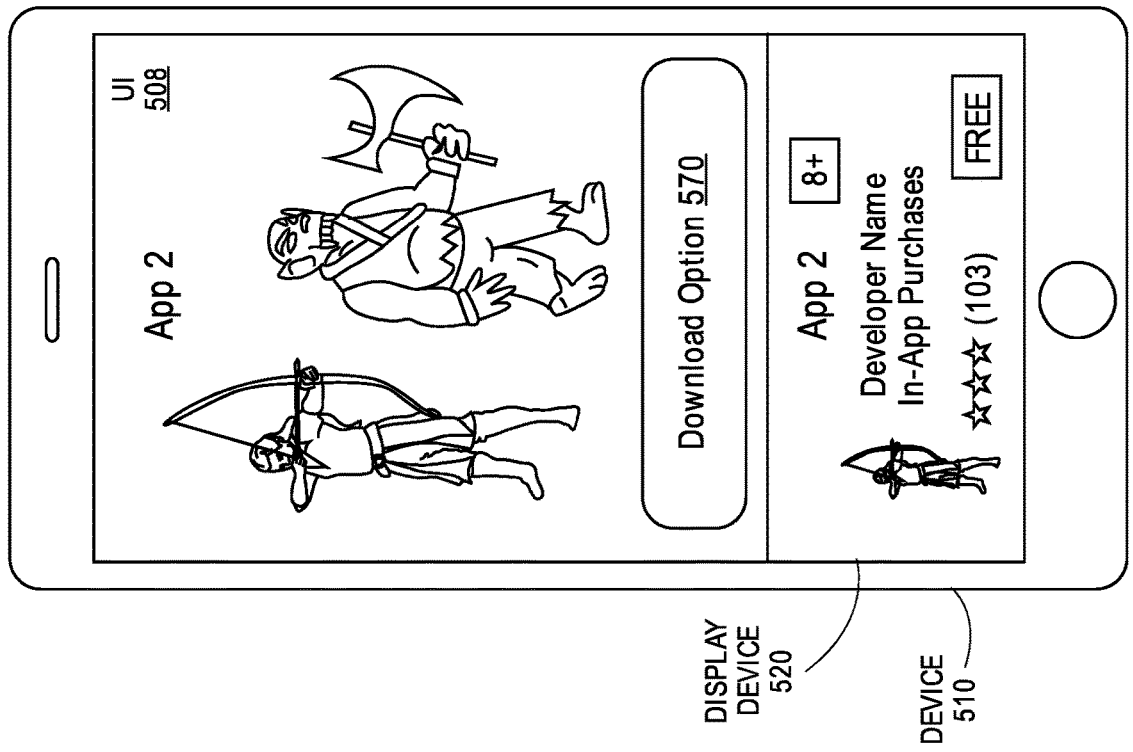

FIGS. 5a-5d illustrate a sequence of exemplary user interfaces for displaying video ads in-app within a software application in accordance with one embodiment. A device 510 (e.g., client device, tablet device, mobile device, etc.) includes a display device 520 for displaying a user interface 502 for application 530 as illustrated in FIG. 5a. The application 530 may be a gaming application with different levels and achievement tiers. In one example, an ad campaign is displayed during an ad play event (e.g., beginning of an application, end of application, when a user dies while playing the application, in between a first level and a second level, etc).

FIG. 5b illustrates a first user interface 504 (e.g., start card) for an ad campaign that is displayed during the ad play event (e.g., a user dies in the gaming application). This user interface 506 includes an ad choice message 530 (e.g., select an ad to continue, select an ad for virtual currency, select an ad for a reward, etc.) and selectable cached video ads on the device 510 including an app 2 video ad with play option 532, an app 3 video ad, an app 4 video ad, a brand ad 540, and a brand ad 550.

Figure 5C:
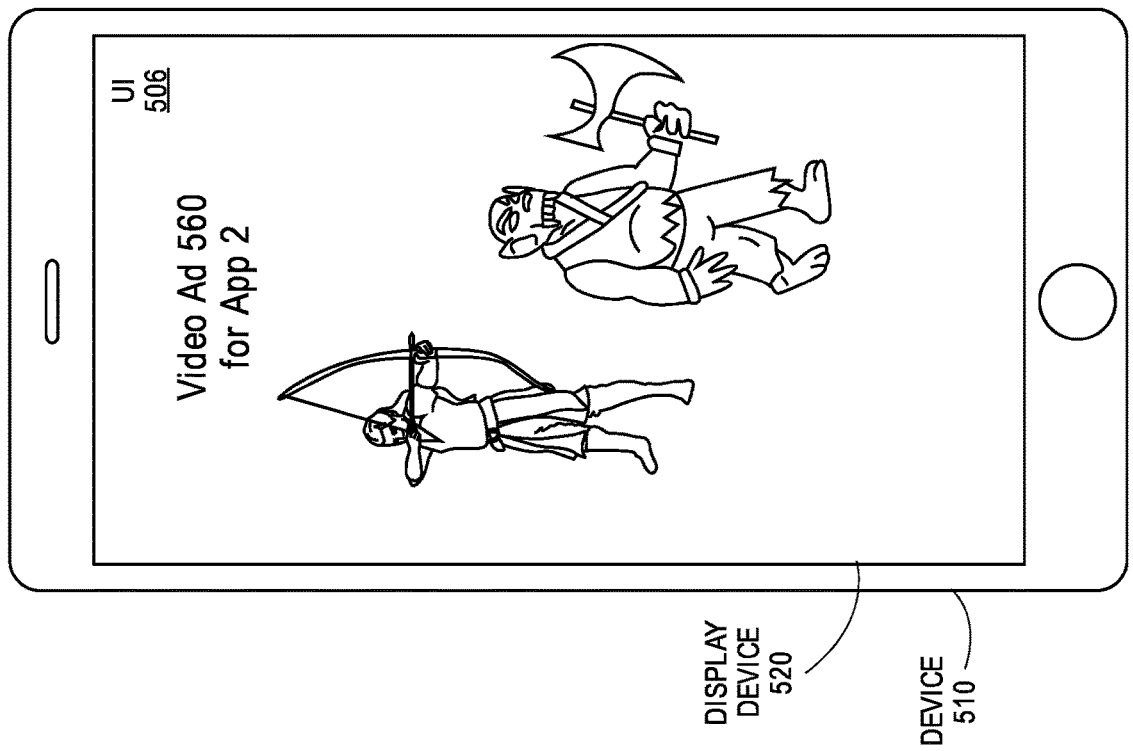

The app and brand ads can be ordered based on a ranking of the video ads as determined by the device as discussed in the methods 300 and 400. All of the cached ads, a subset of the cached ads, or a single cached ad can be displayed. After a user selects one of the video ads (e.g., app 2) then the user interface 506 as illustrated in FIG. 5c is displayed on the device. The user interface 506 includes a video ad 560 for advertising the features and capabilities of the app 2. After the video ad 560 plays, then a user interface 508 is generated and displayed as illustrated in FIG. 5d. The user interface 508 includes a download option 570 for downloading the app 2 onto the device 510 if selected by the user. Additional information (e.g., age rating, developer name, in-app purchases, game rating in terms of a number of stars per reviews of other players, etc.) for app 2 is displayed near a certain region (e.g., lower region) of the user interface 508.

Figure 6:
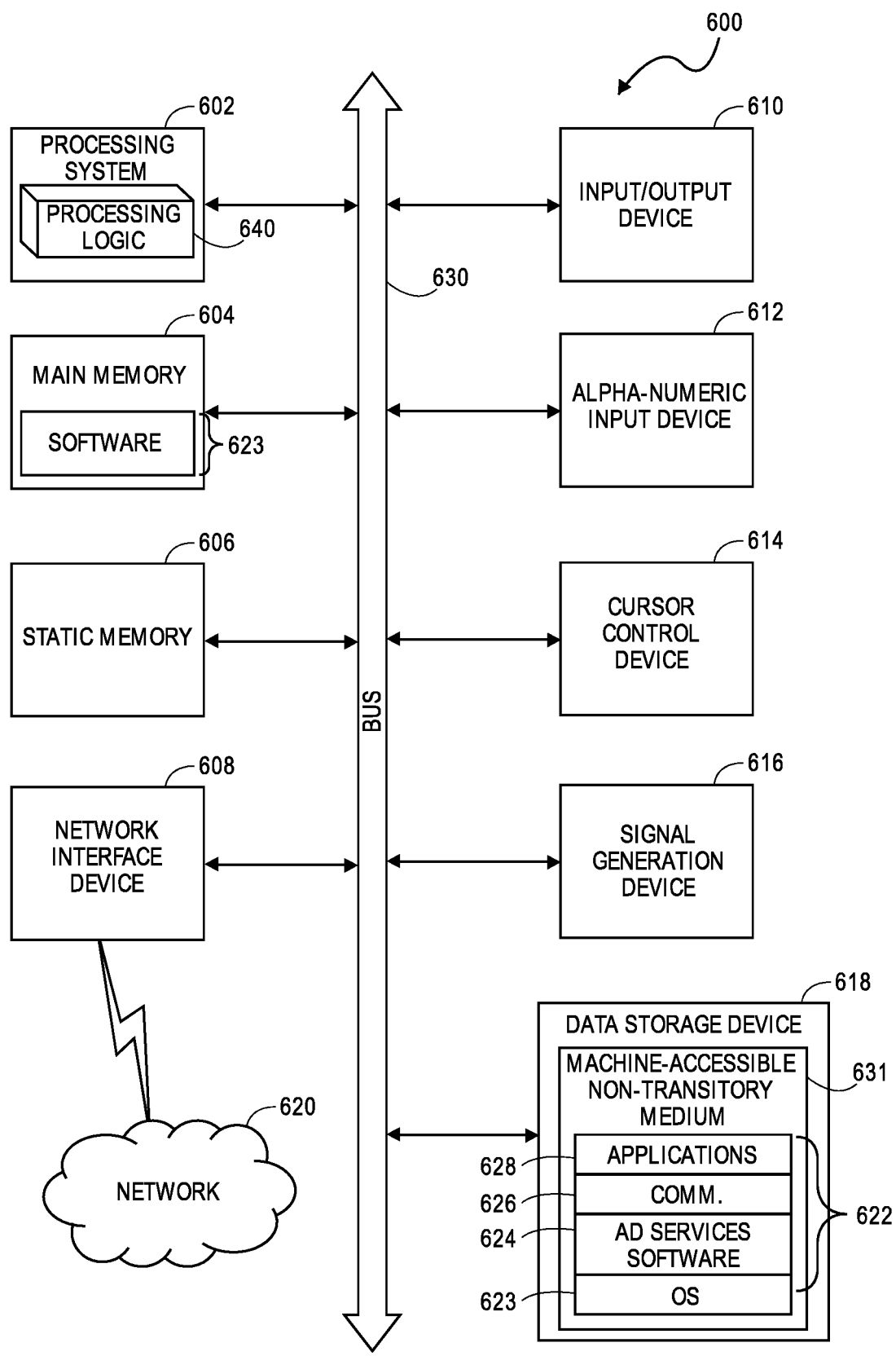
FIG. 6 illustrates a diagrammatic representation of a machine in the exemplary form of a device 600 within which a set of instructions, for causing the machine to perform any one or more of the methodologies discussed herein, may be executed in accordance with certain embodiments.

FIG. 6 illustrates a diagrammatic representation of a machine in the exemplary form of a computer system or device 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 600 (e.g., system 100, system 201, device 230) includes a processing system 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing system 602 represents one or more general-purpose processing devices such as a microprocessor, central processing unit, or the like. More particularly, the processing system 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 602 may also be one or more special-purpose processing devices such as an application specific integrated circuit (ASIC), a field programmable gate array (FPGA), a digital signal processor (DSP), network processor, or the like. The processing system 602 is configured to execute the processing logic 640 for performing the operations and steps discussed herein.

The device 600 may further include a network interface device 608. The device 600 also may include an input/output device 610 or display (e.g., a liquid crystal display (LCD), a plasma display, a cathode ray tube (CRT), or touch screen for receiving user input and displaying output), an optional alphanumeric input device 612 (e.g., a keyboard), an optional cursor control device 614 (e.g., a mouse), and a signal generation device 616 (e.g., a speaker).

The data storage device 618 may include a machine-accessible non-transitory medium 631 on which is stored one or more sets of instructions (e.g., software 622) embodying any one or more of the methodologies or functions described herein. The software 622 may include an operating system 623, advertising services software 624 (e.g., SDK 624), communications module 626, and applications 628 (e.g., publisher applications). The software 622 may also reside, completely or at least partially, within the main memory 604 (e.g., software 623) and/or within the processing system 602 during execution thereof by the device 600, the main memory 604 and the processing system 602 also constituting machine-accessible storage media. The software 622 or 623 may further be transmitted or received over a network 620 via the network interface device 608.

The machine-accessible non-transitory medium 631 may also be used to store data structure sets that define user identifying states and user preferences that define user profiles. Data structure sets and user profiles may also be stored in other sections of device 600, such as static memory 606.

In one embodiment, a machine-accessible non-transitory medium contains executable computer program instructions which when executed by a data processing system cause the system to perform any of the methods discussed herein.

Figure 7:
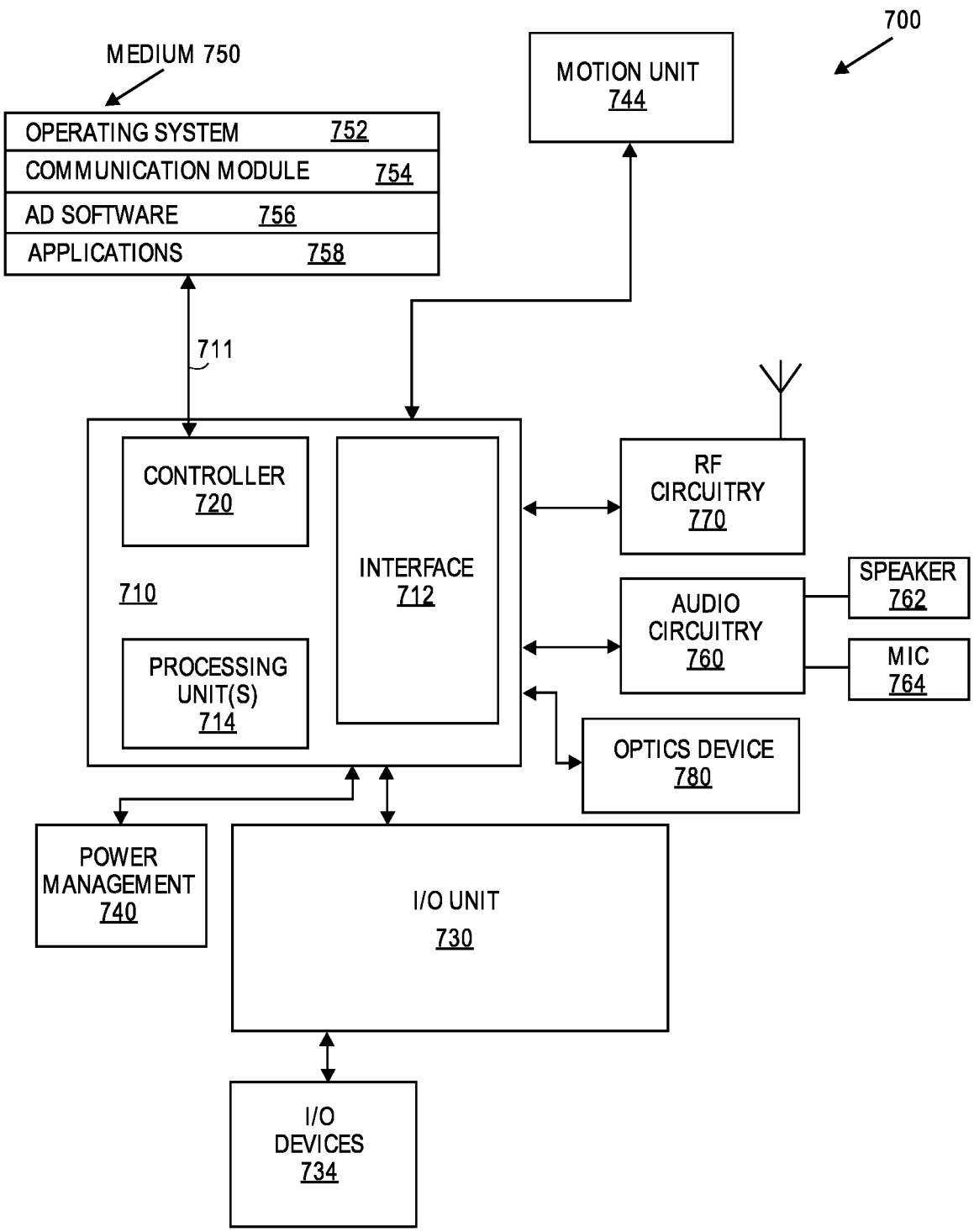
FIG. 7 is a block diagram of a wireless device 700 in accordance with one embodiment.

FIG. 7 is a block diagram of a wireless device 700 in accordance with one embodiment. The wireless device 700 (e.g., device 230) may be any type of wireless device (e.g., cellular phone, wireless phone, tablet, etc.) for sending and receiving wireless communications. The wireless device includes a processing system 710 that includes a controller 720 and processing units 714. The processing system 710 communicates with an Input/Output (I/O) unit 730, radio frequency (RF) circuitry 770, audio circuitry 760, an optics device 760 for capturing one or more images or video, a motion device 744 (e.g., an accelerometer, gyroscope) for determining motion data (e.g., in three dimensions, 6 axis, etc.) for the wireless device 700, power management system 740, and machine-accessible non-transitory medium 750. These components are coupled by one or more communication links or signal lines.

RF circuitry 770 is used to send and receive information over a wireless link or network to one or more other devices. Audio circuitry 760 is coupled to audio speaker 762 and microphone 764 and includes known circuitry for processing voice signals.

One or more processing units 714 communicate with one or more machine-accessible non-transitory mediums 750 (e.g., computer-readable medium) via controller 720. Medium 750 can be any device or medium (e.g., storage device, storage medium) that can store code and/or data for use by one or more processing units 714. Medium 750 can include a memory hierarchy, including but not limited to cache, main memory and secondary memory. The medium 750 stores one or more sets of instructions (or software) embodying any one or more of the methodologies or functions described herein. The software may include an operating system 752, advertising services software 756 (e.g., SDK 756), communications module 754, and applications 758 (e.g., publisher applications, developer applications, a web browser, html5 applications, etc.). The software may also reside, completely or at least partially, within the medium 750 or within the processing units 714 during execution thereof by the device 700. The components shown in FIG. 7 may be implemented in hardware, software, firmware or any combination thereof, including one or more signal processing and/or application specific integrated circuits.

Communication module 754 enables communication with other devices. The I/O unit 730 communicates with different types of input/output (I/O) devices 734 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 750 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a device includes a storage medium to store software programs including advertising services software and software applications, a cache memory, which is integrated or separate from the storage medium, to store video ads. A display device of the device displays software applications and video ads within the software applications. Processing logic is coupled to the storage medium, cache memory, and the display device. The processing logic is configured to execute instructions of at least one of the software programs to receive user input for initiating a software application on the device, determine attributes for the device (e.g., software applications currently operating in the storage medium, placement information for the initiated software application, contextual information for the initiated software application, advertisements recently viewed on the device, orientation of a display device of the device (e.g., portrait orientation, landscape orientation), temporal data (e.g., time of day), and location information for the device) and dynamically select one of the video ads based on the attributes including software applications currently operating in the storage medium and placement information for the initiated software application. The processing logic of the device includes improved computer functionality for dynamically selecting a video ad in real time that is predicted to be at least one of more engaging for a user, cause more interaction with the user, and more likely to convert the video ad into an action, transaction, installation, or purchase based on the attributes or characteristics of the device or user.

In one embodiment, the processing logic is further configured to execute instructions of the at least one of the software programs to display the selected video ad within the initiated software application on the display device during an ad play event of the initiated software application.

In one example, the attributes further include contextual information for the initiated software application, advertisements recently viewed on the device, orientation of the display device, temporal data, and location information for the device.

In one embodiment, the video ads stored in cache memory each include metadata. The metadata for each video ad that is associated with an application includes a genre and a rating for a software application associated with the video ad.

In one embodiment, the processing logic is further configured to execute instructions of the at least one of the software programs to compare the metadata of each video ad in the cache memory with the attributes to select the video ad to display on the display device during the ad play event. The placement information for the initiated software application includes positive placement for a positive user experience while using the initiated software application and negative placement for a negative user experience while using the initiated software application.

In one example, the software applications currently operating in the storage medium are each operating in an active mode, suspended mode, or a sleep mode.

In one embodiment, a machine-accessible non-transitory medium containing executable computer program instructions which when executed by a device cause said device to perform a method for dynamic ad selection of video ads stored on the device. The method includes initiating based on user input a software application on the device, determining attributes for the device (e.g., software applications currently operating in the storage medium, placement information for the initiated software application, contextual information for the initiated software application, advertisements recently viewed on the device, orientation of a display device of the device (e.g., portrait orientation, landscape orientation), temporal data (e.g., time of day), and location information for the device), and dynamically selecting one of the video ads based on the attributes including software applications currently operating in the storage medium and placement information for the initiated software application.

In one embodiment, the processing logic is further configured to execute instructions of the at least one of the software programs to display the selected video ad within the initiated software application on the display device during an ad play event of the initiated software application.

In one example, the attributes further include contextual information for the initiated software application, advertisements recently viewed on the device, orientation of the display device, temporal data, and location information for the device.

In one embodiment, the video ads stored on the device each include metadata. The metadata for each video ad that is associated with an application includes a genre and a rating for a software application associated with the video ad.

In one embodiment, the method further includes comparing the metadata of each video ad in the cache memory with the attributes to select the video ad (e.g., an optimal video ad in terms of predicted user engagement, user interaction, and conversion) to display on the display device during the ad play event.

In one example, the placement information for the initiated software application includes positive placement for a positive user experience while using the initiated software application and negative placement for a negative user experience while using the initiated software application.

In one embodiment, the software applications currently operating in the storage medium are each operating in an active mode, a suspended mode, or a sleep mode.

In one embodiment, a computer implemented method for dynamic ad selection of video ads stored on a device includes initiating based on user input a software application on the device, determining attributes for the device (e.g., software applications currently operating in the storage medium, placement information for the initiated software application, contextual information for the initiated software application, advertisements recently viewed on the device, orientation of a display device of the device (e.g., portrait orientation, landscape orientation), temporal data (e.g., time of day), and location information for the device), and dynamically selecting one of the video ads based on the attributes including software applications currently operating in the storage medium and placement information for the initiated software application.

In one embodiment, the processing logic is further configured to execute instructions of the at least one of the software programs to display the selected video ad in-app within the initiated software application on the display device during an ad play event of the initiated software application.

In one example, the attributes further include contextual information for the initiated software application, advertisements recently viewed on the device, orientation of the display device, temporal data, and location information for the device.

In one embodiment, the video ads stored on the device each include metadata. The metadata for each video ad that is associated with an application includes a genre and a rating for a software application associated with the video ad.

In one embodiment, the method further includes comparing the metadata of each video ad in the cache memory with the attributes to select the video ad to display on the display device during the ad play event.

A device for dynamic ad selection includes a storage medium to store software programs including advertising services software and software applications, cache memory to store video ads, a display device to display software applications and video ads within the software applications, and processing logic coupled to the storage medium, cache memory, and the display device. The processing logic is configured to execute instructions of at least one of the software programs to receive user input for initiating a software application on the device, determine attributes for the device including software applications currently operating in the storage medium and placement information for the initiated software application, dynamically rank the video ads based on the attributes including software applications currently operating in the storage medium and placement information for the initiated software application, and display the video ads on the display device in accordance with the ranking within the initiated software application during an ad play event of the initiated software application.

In one embodiment, the processing logic is further configured to execute instructions of the at least one of the software programs to receive a user input for scrolling through the displayed video ads, respond by scrolling the video ads in a direction of the user input for scrolling, receive a user input for selecting one of the displayed in-app video ads, and display the selected in-app video ad on the display device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A wireless device for dynamic ad selection, comprising:
   a storage medium to store software programs including advertising services software and software applications;
   cache memory coupled to the storage medium or integrated with the storage medium, the cache memory to store video ads;
   a display device for displaying software applications and video ads in-application (in-app) within the software applications; and
   processing logic coupled to the storage medium and display device, the processing logic including a hardware processor that is configured to execute instructions of at least one of the software programs to receive user input using the display device for initiating a software application on the wireless device, to determine attributes for the wireless device including a plurality of different software applications currently operating in the storage medium and a volume setting of the wireless device, to determine a bandwidth for a first network connection between the wireless device and an ad system and a bandwidth for a second network connection between the ad system and an ad exchange for real time bidding of ad exchange participants, to determine an ad selection from the video ads stored in the cache memory of the wireless device when insufficient bandwidth is determined for the first or second network connections, to compare metadata including related applications for a software application that is associated with each of the video ads in the cache memory and the attributes including the plurality of different software applications currently operating in the storage medium and a volume setting of the wireless device for the initiated software application to predict a video ad in the cache memory that is desired in terms of user interaction and engagement, and to dynamically select one of the video ads that are stored in the cache memory of the wireless device in real time in response to the determined bandwidth of the first and second network connections and the comparison of the metadata including related applications for a software application that is associated with each of the video ads and the attributes to predict the video ad in the cache memory that is desired in terms of user interaction and engagement.

2. The wireless device of claim 1, wherein the processing logic is further configured to execute instructions of the at least one of the software programs to display the selected video ad in-app within the initiated software application on the display device during an ad play event of the initiated software application.

3. The wireless device of claim 1, wherein the attributes further include contextual information for the initiated software application, advertisements recently viewed on the device, orientation of the display device, temporal data, and location information for the device.

4. The wireless device of claim 1, wherein the video ads stored in the cache memory each include metadata, wherein the metadata for each video ad that is associated with a software application includes a genre and a rating for the software application associated with the video ad.

5. The wireless device of claim 4, wherein the hardware processor is further configured to execute instructions of the at least one of the software programs to compare the metadata of each video ad in the cache memory with the attributes of the wireless device including a plurality of different software applications currently operating in the storage medium and placement information for the initiated software application to select the video ad to display on the display device during the ad play event, wherein the processing logic compares metadata including genre, ratings, and related applications for a software application that is associated with each of the video ads in the cache memory and the attributes including the plurality of different software applications currently operating in the storage medium to determine levels of similarities and levels of differences between the software application that is associated with each of the video ads and the plurality of different software applications to predict a video ad in memory that is desired in terms of user interaction and engagement.

6. The wireless device of claim 1, wherein the hardware processor is further configured to execute instructions to determine a first ranking of the video ads and to determine a second ranking of the video ads in response to any change in any attribute including a change from a positive placement to a negative placement or a change from a negative placement to a positive placement, wherein placement information for the initiated software application includes a timing of when to display a dynamically selected video ad with the display device and also includes the positive placement assigned by the wireless device for a positive user experience and the negative placement assigned by the wireless device for a negative user experience for the initiated software application, wherein the positive user experience includes at least one of unlocking achievement or rewards, frequent use of the initiated software application, and increasing a volume setting of the wireless device while using the initiated software application and the negative user experience includes at least one of a character of a user dying within the initiated software application, infrequent use of the initiated software application, and decreasing a volume setting of the wireless device while using the initiated software application.

7. The wireless device of claim 1, wherein the software applications currently operating in the storage medium are each operating in an active mode, a suspended mode, or a sleep mode.

8. A machine-accessible non-transitory storage medium containing executable computer program instructions which when executed by a hardware processor of a wireless device cause said wireless device to perform a method for dynamic ad selection of video ads stored on the wireless device, the method comprising:

initiating based on receiving user input for a display device of the wireless device a software application on the wireless device;

determining, with the hardware processor, attributes for the wireless device including a plurality of different software applications currently operating in a storage medium of the wireless device and a volume setting for the initiated software application;

determining, with the hardware processor, a bandwidth for a first network connection between the wireless device and an ad system and a bandwidth for a second network connection between the ad system and an ad exchange for real time bidding of ad exchange participants;

determining, with the hardware processor, an ad selection from the video ads stored on the wireless device when insufficient bandwidth is determined for the first or second network connections;

comparing metadata including related applications for a software application that is associated with each of the video ads stored on the wireless device and the attributes including the plurality of different software applications currently operating in the storage medium and a volume setting of the wireless device for the initiated software application to predict a video ad in a cache memory that is desired in terms of user interaction and engagement; and dynamically selecting, with the hardware processor, one of the video ads stored in the cache memory of the wireless device in real time for display on the display device of the wireless device in response to the determined bandwidth of the first and second network connections and the comparison of the metadata including related applications for a software application that is associated with each of the video ads and the attributes to predict the video ad in the cache memory that is desired in terms of user interaction and engagement.

9. The machine-accessible non-transitory storage medium of claim 8, wherein the hardware processor is further configured to execute instructions of the at least one of the software programs to display the selected video ad in-application (in-app) within the initiated software application on the display device of the wireless device during an ad play event of the initiated software application.

10. The machine-accessible non-transitory storage medium of claim 8, wherein the attributes further include contextual information for the initiated software application, advertisements recently viewed on the wireless device, orientation of the display device, temporal data, and location information for the wireless device.

11. The machine-accessible non-transitory storage medium of claim 8, wherein the video ads stored on the wireless device each include metadata, wherein the metadata for each video ad that is associated with a software application includes a genre and a rating for the software application associated with the video ad, wherein the wireless device compares metadata including genre, ratings, and related applications for a software application that is associated with each of the video ads in the cache memory and the attributes including the plurality of different software applications currently operating in the storage medium to determine levels of similarities and levels of differences between the software application that is associated with each of the video ads and the plurality of different software applications to predict a video ad in the cache memory that is desired in terms of user interaction and engagement.

12. The machine-accessible non-transitory storage medium of claim 8, wherein the method further includes determining a first ranking of the video ads and a second ranking of the video ads in response to any change in any attribute including a change from a positive placement to a negative placement or a change from a negative placement to a positive, wherein placement information for the initiated software application includes a timing of when to display a dynamically selected video ad with the display device and also includes the positive placement assigned by the wireless device for a positive user experience and the negative placement assigned by the wireless device for a negative user experience for the initiated software application, wherein the positive user experience includes at least one of unlocking achievement or rewards, frequent use of the initiated software application, and increasing a volume setting of the wireless device while using the initiated software application and the negative user experience includes at least one of a character of a user dying within the initiated software application, infrequent use of the initiated software application, and decreasing a volume setting of the wireless device while using the initiated software application.

13. The machine-accessible non-transitory storage medium of claim 8, wherein the software applications currently operating in the storage medium are each operating in an active mode, a suspended mode, or a sleep mode.

14. A computer implemented method for dynamic ad selection of video ads stored on a wireless device, the method comprising:

initiating based on receiving user input for a display device of the wireless device a software application on the wireless device;

determining, with a hardware processor of the wireless device, attributes for the wireless device including a plurality of different software applications currently operating in a storage medium of the wireless device and a volume setting of the wireless device;

determining, with the hardware processor, a bandwidth for a first network connection between the wireless device and an ad system and a bandwidth for a second network connection between the ad system and an ad exchange for real time bidding of ad exchange participants;

determining an ad selection from the video ads stored on the wireless device in response to insufficient bandwidth being determined for the first or second network connections;

comparing metadata including related applications for a software application that is associated with each of the video ads stored on the wireless device and the attributes including the plurality of different software applications currently operating in the storage medium and a volume setting of the wireless device to predict a video ad in cache memory of the wireless device that is desired in terms of user interaction and engagement; and dynamically selecting, with the hardware processor, one of the video ads in real time in response to the determined bandwidth of the first and second network connections and the comparison of the metadata including related applications for a software application that is associated with each of the video ads and the attributes to predict the video ad in the cache memory that is desired in terms of user interaction and engagement.

15. The method of claim 14, further comprising:
displaying the selected video ad in-application (in-app) within the initiated software application on the display device during an ad play event of the initiated software application.

16. The method of claim 14, wherein the attributes further include contextual information for the initiated software application, advertisements recently viewed on the wireless device, orientation of the display device, temporal data, and location information for the wireless device.

17. The method of claim 14, wherein the video ads stored on the wireless device each include metadata, wherein the metadata for each video ad that includes a software application includes a genre and a rating for the software application associated with the video ad.

18. A wireless device for dynamic ad selection, comprising:
a storage medium to store software programs including advertising services software and software applications;
cache memory coupled to the storage medium or integrated with the storage medium, the cache memory to store video ads;
a display device to display software applications and video ads in-application (in-app) within the software applications; and
processing logic coupled to the storage medium, memory, and the display device, the processing logic including a hardware processor that is configured to execute instructions of at least one of the software programs to receive user input using the display device for initiating a software application on the wireless device, to determine attributes for the wireless device including a plurality of different software applications currently operating in the storage medium and placement information for the initiated software application, to compare metadata including related applications for a software application that is associated with each of the video ads in the cache memory and the attributes including the plurality of different software applications currently operating in the storage medium and a change in a volume setting for the wireless device to predict a video ad in the cache memory that is desired in terms of user interaction and engagement, to dynamically rank the video ads that are stored in the cache memory in real time in response to the determined bandwidth of the first and second network connections and the comparison of the metadata including related applications for a software application that is associated with each of the video ads and the attributes including the change in the volume of the wireless device, and to display the video ads on the display device in accordance with the ranking in-app within the initiated software application during an ad play event of the initiated software application.

19. The wireless device of claim 18, wherein the processing logic is further configured to execute instructions of the at least one of the software programs to:
receive a user input for interaction of a user with hardware of the wireless device;
determine an emotional state of the user based on the user input that is received while the user is viewing at least one of the video ads that are displayed on the wireless device.

20. The wireless device of claim 19, wherein the hardware of the wireless device comprises at least one of the display device, a motion device, a gyroscope, an accelerometer, a smart watch, a heart rate monitor, and a blood pressure sensor.

* * * * *